United States Patent
Tochikubo et al.

(10) Patent No.: US 7,096,357 B1
(45) Date of Patent: Aug. 22, 2006

(54) CRYPTOGRAPHIC COMMUNICATION TERMINAL, CRYPTOGRAPHIC COMMUNICATION CENTER APPARATUS, CRYPTOGRAPHIC COMMUNICATION SYSTEM, AND STORAGE MEDIUM

(75) Inventors: Kouya Tochikubo, Yokohama (JP); Naoki Endoh, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/518,782

(22) Filed: Mar. 3, 2000

(30) Foreign Application Priority Data

Mar. 5, 1999 (JP) ................................. 11-058592

(51) Int. Cl.
*H04L 9/00* (2006.01)
*H04L 9/32* (2006.01)
*G06F 12/14* (2006.01)

(52) U.S. Cl. ..................................... 713/164; 713/189
(58) Field of Classification Search ................ 713/164, 713/189
See application file for complete search history.

(56) References Cited

U.S. PATENT DOCUMENTS

| | | | | |
|---|---|---|---|---|
| 4,440,976 A | * | 4/1984 | Bocci et al. | 380/277 |
| 4,484,025 A | * | 11/1984 | Ostermann et al. | 380/279 |
| 4,694,492 A | * | 9/1987 | Wirstrom et al. | 713/159 |
| 5,029,207 A | | 7/1991 | Gammie | 380/10 |
| 5,185,796 A | | 2/1993 | Wilson | 380/21 |
| 5,199,069 A | * | 3/1993 | Barrett et al. | 380/28 |
| 5,276,735 A | * | 1/1994 | Boebert et al. | 713/167 |
| 5,341,426 A | * | 8/1994 | Barney et al. | 713/171 |
| 5,491,749 A | * | 2/1996 | Rogaway | 713/171 |
| 5,491,750 A | * | 2/1996 | Bellare et al. | 713/155 |
| 5,684,875 A | | 11/1997 | Ellenberger | 380/4 |

(Continued)

FOREIGN PATENT DOCUMENTS

JP  1-220925  7/1989

(Continued)

OTHER PUBLICATIONS

Notification of Reasons for Rejection from Japanese Patent Office mailed on Oct. 11, 2005, in Japanese Patent Application No. 11-058592.

*Primary Examiner*—Jacques H. Louis-Jacques
*Assistant Examiner*—Christopher J. Brown
(74) *Attorney, Agent, or Firm*—Finnegan, Henderson, Farabow, Garrett & Dunner, L.L.P.

(57) ABSTRACT

A cryptographic communication terminal serving as one of information transmitting and receiving terminals in cryptographic communication includes a cryptographic algorithm storage section for storing one or more types of cryptographic algorithm used for cryptographic communication, and outputting a designated cryptographic algorithm, a key information storage section for storing a key used for cryptographic communication corresponding to the cryptographic algorithm, and outputting a designated key, a control section for designating, with respect to the cryptographic algorithm storage section and the key information storage section, which cryptographic algorithm and key are to be used in the cryptographic communication, and an encryption/decryption section for decrypting received encryption information by using the cryptographic algorithm designated with respect to the cryptographic algorithm storage section and the key designated with respect to the key information storage section, and encrypting information to be transmitted.

17 Claims, 6 Drawing Sheets

U.S. PATENT DOCUMENTS

| | | | |
|---|---|---|---|
| 5,721,777 A * | 2/1998 | Blaze | 380/286 |
| 5,751,805 A * | 5/1998 | Otsuki et al. | 705/54 |
| 5,852,665 A * | 12/1998 | Gressel et al. | 380/30 |
| 5,915,025 A | 6/1999 | Taguchi et al. | 380/44 |
| 6,052,785 A * | 4/2000 | Lin et al. | 713/201 |
| 6,236,727 B1 * | 5/2001 | Ciacelli et al. | 380/212 |
| 6,249,866 B1 * | 6/2001 | Brundrett et al. | 713/165 |
| 6,502,240 B1 * | 12/2002 | Naclerio | 717/170 |
| 6,550,009 B1 * | 4/2003 | Uranaka et al. | 713/168 |
| 6,662,299 B1 * | 12/2003 | Price, III | 713/171 |
| 6,694,025 B1 * | 2/2004 | Epstein et al. | 380/279 |
| 2003/0046564 A1 * | 3/2003 | Masuda et al. | 713/193 |

FOREIGN PATENT DOCUMENTS

| | | |
|---|---|---|
| JP | 9-258977 | 3/1997 |
| WO | WO 95/34968 | 12/1995 |

* cited by examiner

CRYPTOGRAPHIC COMMUNICATION TERMINAL, CRYPTOGRAPHIC COMMUNICATION CENTER APPARATUS, CRYPTOGRAPHIC COMMUNICATION SYSTEM, AND STORAGE MEDIUM

CROSS-REFERENCE TO RELATED APPLICATION

This application is based upon and claims the benefit of priority from the prior Japanese Patent Application No. 11-058592, filed Mar. 5, 1999; the entire contents of which are incorporated herein by reference.

BACKGROUND OF THE INVENTION

This application is based on Japanese Patent Application No. 11-58592, filed Mar. 5, 1999, the contents of which are incorporated herein by reference. The present invention relates to a cryptographic communication terminal, cryptographic communication center apparatus, cryptographic communication system, and storage medium and, more particularly, to a cryptographic communication terminal, cryptographic communication center apparatus, cryptographic communication system, and storage medium which are characterized in that a plurality of cryptographic algorithms can be used and a new cryptographic algorithm can be safely and efficiently registered and used.

Various current devices connected to a network incorporate encryption techniques to prevent breaches of security. With the use of the these incorporated encryption techniques, electronic business transactions, contents distribution businesses, and the like using networks as media are growing. These businesses depend on the safety of the incorporated encryption techniques. Under the circumstances, studies on the design of safe, efficient cryptographic algorithms have been enthusiastically conducted.

According to a conventional system incorporating an encryption technique, once system specifications are determined by standardization or the like, a cryptographic scheme that can be used by the system is fixed. Consequently, the security level of the system is also fixed.

On the other hand, studies on cryptanalysis of cryptographic algorithms have also been enthusiastically conducted to evaluate the safety of the cryptographic algorithms concurrently with the studies on the design of safe cryptographic algorithms. Therefore, the cryptographic scheme used by a given system may be actually broken.

If the cryptographic scheme used by the system is broken in this manner, the system cannot be used unless the cryptographic scheme is updated. That is, in order to continue safe network communication, the cryptographic scheme of the system must be updated.

In updating the cryptographic scheme through the network, however, a problem is posed in terms of safety. For example, confidential information may leak to the outside. If the cryptographic scheme is to be updated without the mediacy of a network, updating must be performed in all the devices in the system one by one. This makes it impossible to efficiently update the scheme.

BRIEF SUMMARY OF THE INVENTION

It is an object of the present invention to provide a cryptographic communication terminal, cryptographic communication center apparatus, cryptographic communication system, and storage medium which can perform cryptographic communication by selecting a cryptographic algorithm.

It is another object of the present invention to provide a cryptographic communication terminal, cryptographic communication center apparatus, cryptographic communication system, and storage medium which safely and efficiently register a new cryptographic algorithm through a network, and can make the registered algorithm usable.

According to the first aspect of the present invention, a cryptographic communication terminal comprises a cryptographic algorithm storage section for storing not less than one type of cryptographic algorithm used for cryptographic communication, and outputting a designated cryptographic algorithm, a key information storage section for storing a key used for cryptographic communication corresponding to the cryptographic algorithm and for outputting the designated key, control means for designating, with respect to the cryptographic algorithm storage section and the key information storage section, which cryptographic algorithm and key are to be used in the cryptographic communication, and encryption/decryption means for decrypting received encryption information by using the cryptographic algorithm designated with respect to the cryptographic algorithm storage section and the key designated with respect to the key information storage section, and encrypting information to be transmitted.

According to the second aspect of the present invention, a cryptographic communication center apparatus comprises the cryptographic communication terminal, and when the algorithm decryption key is requested from the partner, inputs the corresponding algorithm decryption key as the information to be transmitted to the partner to the encryption/decryption means.

According to the third aspect of the present invention, there is provided a computer readable storage medium storing a program which is used by a cryptographic communication apparatus serving as one of information transmitting and receiving apparatuses in cryptographic communication and implements a cryptographic algorithm storage section for storing not less than one type of cryptographic algorithm used for cryptographic communication, and outputting a designated cryptographic algorithm, a key information storage section for storing a key used for cryptographic communication corresponding to the cryptographic algorithm and outputting a designated key, control means for designating, with respect to the cryptographic algorithm storage section and the key information storage section, which cryptographic algorithm and key are to be used in the cryptographic communication, and encryption/decryption means for decrypting received encryption information by using the cryptographic algorithm designated with respect to the cryptographic algorithm storage section and the key designated with respect to the key information storage section, and encrypting information to be transmitted.

With these means, the present invention can perform cryptographic communication upon selectively using cryptographic algorithms. This makes it possible to perform cryptographic communication upon selecting a safer cryptographic scheme.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below.

In each embodiment, encrypted data are represented by E1(x)[y], E2(x)[y], E(z, x)[y], and the like. In this case, reference symbol x denotes a key used for encryption; y, data to be encrypted; z, an algorithm used for encryption, and a|b, a concatenation between a and b.

Figure 1:
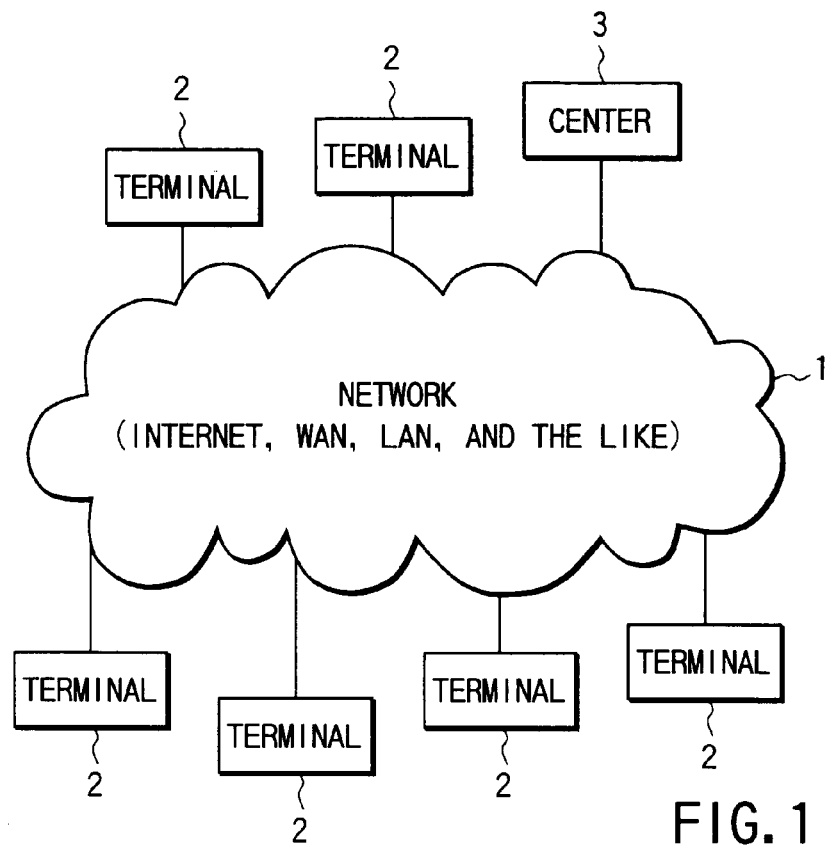
FIG. 1 is a view showing an example of a cryptographic communication system according to the first embodiment of the present invention.

FIG. 1 shows an example of an cryptographic communication system according to the first embodiment of the present invention.

In the cryptographic communication system in FIG. 1, cryptographic communication terminals 2 (to be also referred to as the terminals 2 hereinafter) and a cryptographic communication center apparatus 3 (to be also referred to as the center 3 hereinafter) are connected to various networks 1 such as the Internet and LAN. Communication (or cryptographic communication) between the terminals 2 and between the terminal 2 and the center 3 can be executed through the network 1.

Figure 2:
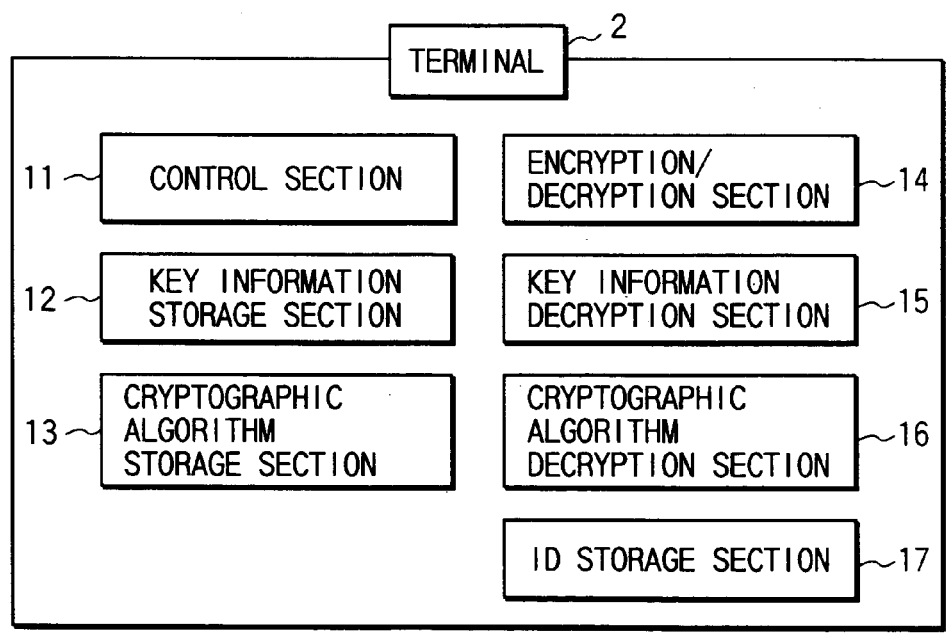
FIG. 2 is a block diagram showing an example of the arrangement of a cryptographic communication terminal.

FIG. 2 is a block diagram showing an example of the arrangement of the cryptographic communication terminal.

The cryptographic communication terminal 2 is comprised of a control section 11, key information storage section 12, cryptographic algorithm storage section 13, encryption/decryption section 14, key information decryption section 15, cryptographic algorithm decryption section 16, and ID storage section 17. The terminal 2 is a means having computer elements such as a CPU and memory, and implements the above functional means by the operation of the CPU controlled by programs. The terminal 2 also includes a communication unit (not shown) for network communication.

Figure 3:
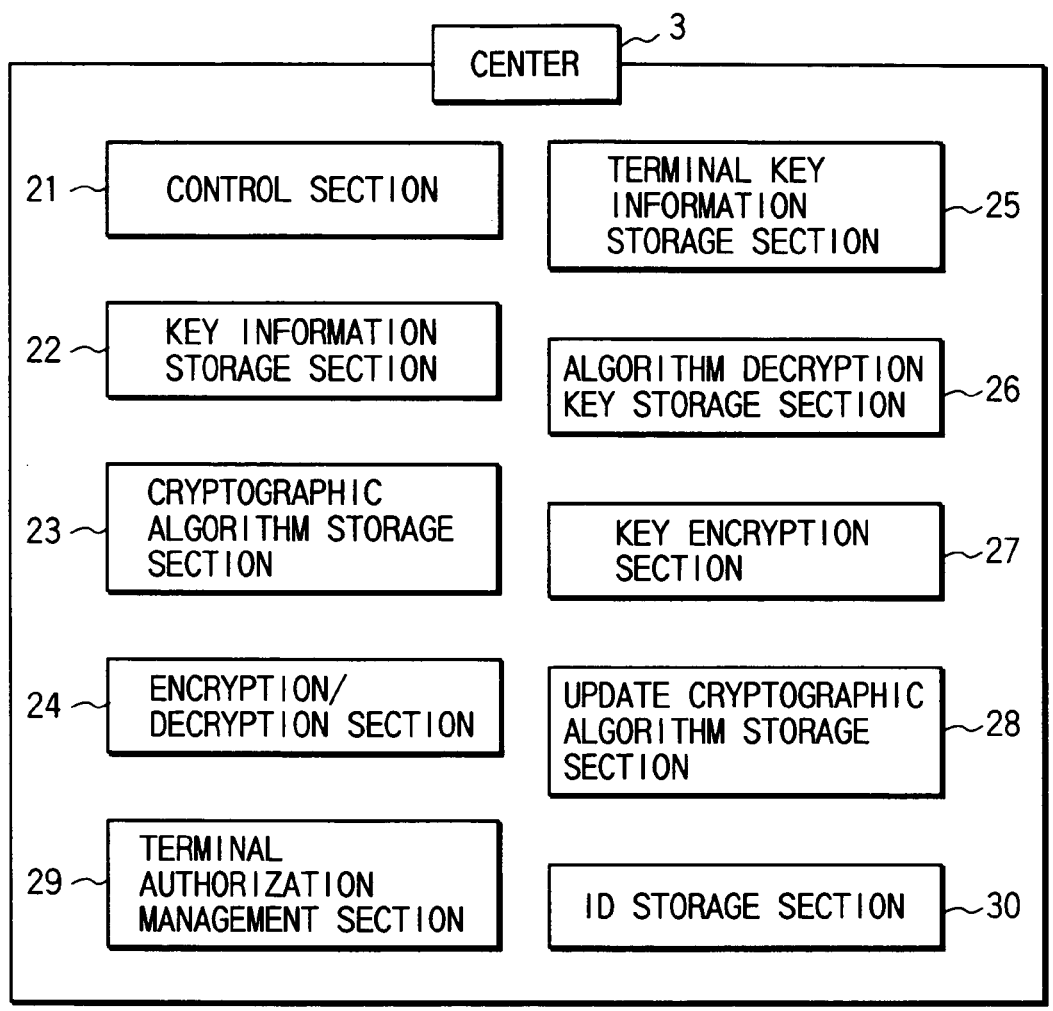
FIG. 3 is a block diagram showing an example of the arrangement of a cryptographic communication center apparatus.

FIG. 3 is a block diagram showing an example of the arrangement of the cryptographic communication center apparatus.

The cryptographic communication center apparatus 3 is comprised of a control section 21, key information storage section 22, cryptographic algorithm storage section 23, encryption/decryption section 24, terminal key information storage section 25, algorithm decryption key storage section 26, key encryption section 27, update cryptographic algorithm storage section 28, terminal authorization management section 29, and ID storage section 30. Similar to the terminal 2, the center 3 is a means having computer elements such as a CPU and memory, and implements the above functional means by the operation of the CPU controlled by programs. The center 3 also includes a communication unit (not shown) for network communication.

Each constituent element of the cryptographic communication terminal 2 will be described first.

The control section 11 controls the flow of data by controlling the sections 12 to 17, and supplies, for example, identification information (ID), messages, and the like to the functional sections 12, 13, and 14. The control section 11 also selects a private key and cryptographic algorithm to be used for cryptographic communication by designating ID information.

The ID storage section 17 stores various IDs, e.g., the IDs of the center 3 and terminal 2, the ID of an algorithm (AI), and the ID of a key.

The key information storage section 12 stores encrypted key information (an algorithm decryption key used to decrypt an encrypted cryptographic algorithm, in addition to key information for cryptographic communication). Upon reception of the ID of a terminal or the like and an algorithm ID, the key information storage section 12 outputs encrypted key information corresponding to these data to the key information decryption section 15.

The key information decryption section 15 decrypts and outputs the key information transferred from the key information storage section 12 by using a unique private key.

The cryptographic algorithm storage section 13 stores encrypted algorithms. Upon reception of an algorithm ID, the cryptographic algorithm storage section 13 outputs an encrypted cryptographic algorithm corresponding to the ID to the cryptographic algorithm decryption section 16.

The cryptographic algorithm decryption section 16 decrypts the cryptographic algorithm output from the cryptographic algorithm storage section 13 by using the key received from the key information decryption section 15.

The encryption/decryption section 14 encrypts a message M by using the algorithm decrypted by the cryptographic algorithm decryption section 16 and the communication key decrypted by the key information decryption section 15.

Each constituent element of the cryptographic communication center apparatus 3 will be described next.

The control section 21 controls the flow of information by controlling the operations of the sections 22 to 30, and supplies IDs and the like to corresponding functional sections. The control section 21 selects a private key and cryptographic algorithm to be used for cryptographic communication by designating ID information, and also selects a cryptographic algorithm for which the terminal 2 generated an update request and a decryption key for the algorithm.

The key information storage section 22 stores private keys used for cryptographic communication between the respective terminals 2 and the center 3. Upon reception of a terminal ID, the key information storage section 22 outputs a corresponding private key to the encryption/decryption section 24.

The cryptographic algorithm storage section 23 stores various cryptographic algorithms. Upon reception of an algorithm ID, the cryptographic algorithm storage section 23 outputs a corresponding cryptographic algorithm to the encryption/decryption section 24.

The terminal key information storage section 25 stores the unique private keys of the respective terminals. Upon reception of a terminal ID, the terminal key information storage section 25 outputs the private key of a corresponding terminal to the key encryption section 27.

The algorithm decryption key storage section 26 stores decryption keys for the respective encrypted cryptographic algorithms. Upon reception of an algorithm ID, the algorithm decryption key storage section 26 outputs the decrypted key of a corresponding cryptographic algorithm to the key encryption section 27.

The key encryption section 27 encrypts the decryption key for the cryptographic algorithm by using the private key unique to the terminal, and outputs the resultant data to the encryption/decryption section 24.

The update cryptographic algorithm storage section 28 stores a new cryptographic algorithm to be supplied to the terminal 2. Upon reception of an algorithm ID, the update cryptographic algorithm storage section 28 outputs an encrypted cryptographic algorithm corresponding to the ID to the encryption/decryption section 24.

The encryption/decryption section 24 encrypts the algorithm decryption key output from the key encryption section 27 and/or the cryptographic algorithm output from the update cryptographic algorithm storage section 28 by using the cryptographic algorithm from the cryptographic algorithm storage section 23 and the key received from the key information storage section 22.

The terminal authorization management section 29 checks whether a terminal requesting an update cryptographic algorithm or its algorithm decryption key has proper authorization, and permits process by the respective sections 21 to 28 only if the terminal has proper authorization.

The ID storage section 30 stores the IDs of terminals, algorithms, algorithm decryption keys, and the like. Upon reception of an ID acquisition request from the terminal 2, the control section 21 transmits a corresponding ID from the ID storage section 30 to the requesting terminal 2.

The operation of the cryptographic communication system according to this embodiment having the above arrangement will be described next.

Inter-terminal cryptographic communication will be described first.

Figure 4:
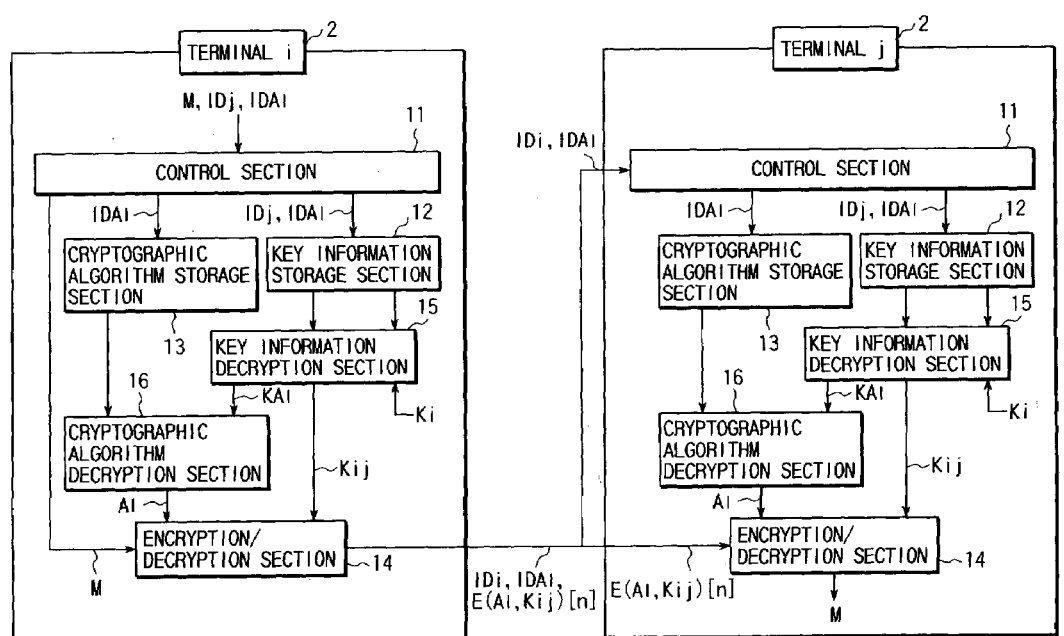
FIG. 4 is a block diagram showing how cryptographic communication is performed between terminals.

FIG. 4 shows how cryptographic communication is performed between terminals.

FIG. 4 shows a procedure for transmitting a message M from a terminal $2i$ to a terminal $2j$ upon encrypting it using a cryptographic algorithm Al.

In this case, first of all, the control section 11 of the terminal $2i$ extracts, from the ID storage section 17, ID information IDj such as the name of the receiving terminal $2j$ or mail address and ID information IDAl of the cryptographic algorithm Al used for cryptographic communication. The message M is also input to the control section 11. That is, the control section 11 also serves as a means for designating a cryptographic algorithm to be used. Note that each of the terminals $2i$ and $2j$ has already requested the center 3 for necessary ID information and has received the ID information of the ID storage section 30 in the center 3.

The message M is output from the control section 11 to the encryption/decryption section 14. At the same time, IDAl is output to the cryptographic algorithm storage section 13, and IDj and IDAl are output to the key information storage section 12.

In this case, key information is extracted from the key information storage section 12 in accordance with the input ID information and output to the key information decryption section 15. That is, an encrypted private key E1(Ki)[Kij] and algorithm decryption key E1(Ki)[KAl] are respectively output in accordance with IDj and IDAl. In this case, Kij is a key for cryptographic communication between the terminals $2i$ and $2j$. For example, a DES secret key or the like corresponds to this key Kij.

The key information decryption section 15 decrypts this encrypted key information by using key information Ki unique to the terminal, e.g., a password or the key stored in an IC card. Of this information, a decryption key KAl of the encrypted algorithm Al is output to the cryptographic algorithm decryption section 16, and the key Kij is output to the encryption/decryption section 14.

The cryptographic algorithm storage section 13 outputs an encrypted cryptographic algorithm E2(KAl)[Al] to the cryptographic algorithm decryption section 16 on the basis of the ID information input from the control section 11.

The cryptographic algorithm decryption section 16 decrypts this input encrypted cryptographic algorithm by using the algorithm decryption key KAl and outputs the resultant data as the cryptographic algorithm Al to the encryption/decryption section 14.

The encryption/decryption section 14 encrypts the message M to be transmitted by using the input message M, cryptographic algorithm Al, and private key Kij.

IDi representing the transmitting terminal and IDAl of the cryptographic algorithm to be used for this cryptographic communication are added to ciphertext E(Al, Kij)[M] generated in this manner. A communication unit (not shown) transmits this ciphertext to the terminal $2j$ through the network 1.

In the terminal $2j$ which has received this cryptographic communication, first of all, the control section 11 outputs IDAl to the cryptographic algorithm storage section 13, and IDi and IDAl to the key information storage section 12.

The key information storage section 12, which has received this ID information, outputs an encrypted private key E1(Kj)[Kij] and algorithm decryption key E1(Kj)[KAl] to the key information decryption section 15.

The key information decryption section 15 decrypts these pieces of encrypted key information by using key information Kj unique to the terminal, e.g., a password or the key stored in an IC card. Of these pieces of information, KAl is output to the cryptographic algorithm decryption section 16, and Kij is output to the encryption/decryption section 14.

The cryptographic algorithm storage section 13 outputs the encrypted cryptographic algorithm E2(KAl)[Al] to the cryptographic algorithm decryption section 16 on the basis of the ID information input from the control section 11 to the cryptographic algorithm storage section 13.

The cryptographic algorithm decryption section 16 decrypts the cryptographic algorithm E2(KAl)[Al] by using the algorithm decryption key KAl, and outputs the resultant data as the algorithm Al to the encryption/decryption section 14.

The encryption/decryption section 14 decrypts the ciphertext E(Al, Kij)[M] received from the terminal $2i$ by using the cryptographic algorithm Al and private key Kij and outputs the message M.

In this manner, cryptographic communication from the terminal 2*i* to the terminal 2*j* is realized by using the cryptographic algorithm Al. In this case, since the algorithm ID to be supplied first can be changed as needed, the cryptographic algorithm can be changed to any cryptographic algorithm as long as it is registered in both the terminals 2*i* and 2*j*.

A registration (updating) procedure for acquiring a cryptographic algorithm from the centers that is not held in the terminal 2 and registering the new cryptographic algorithm will be described next. This updating procedure includes update procedure #1 by which both a cryptographic algorithm and its decryption key are acquired from the cryptographic communication center apparatus 3, and updating procedure #2 by which a cryptographic algorithm is acquired from another cryptographic communication terminal 2, and its decryption key is acquired from the center 3. In this embodiment, updating procedure #1 will be described. Update procedure #2 will be described in the second embodiment.

Figure 5:
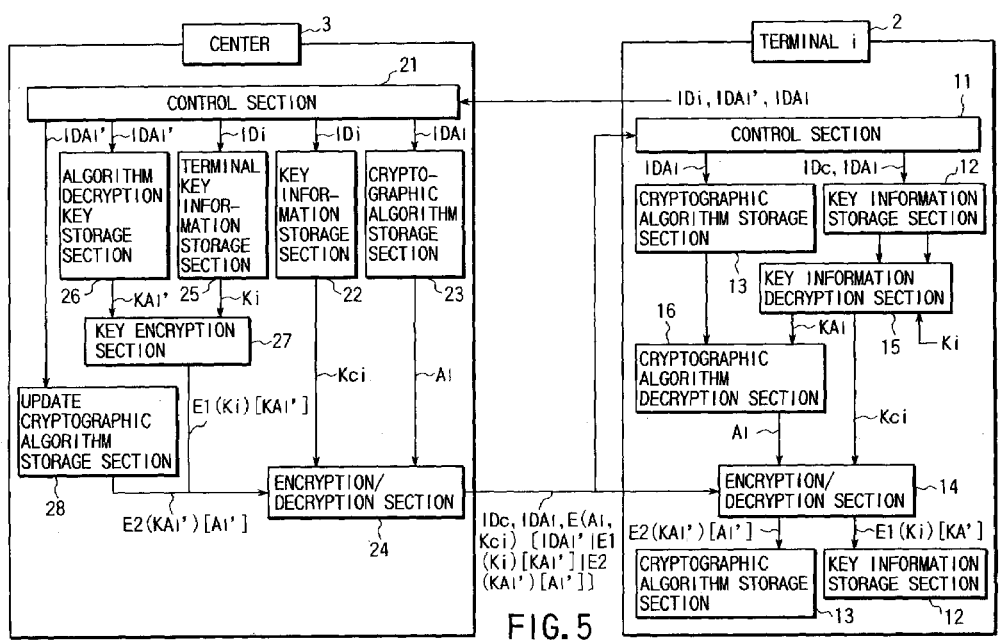
FIG. 5 is a block diagram showing updating procedure #1 for acquiring both a cryptographic algorithm and its decryption key from a cryptographic communication center apparatus 3.

FIG. 5 shows the processing in updating procedure #1 by which both a cryptographic algorithm and its decryption key are acquired from the cryptographic communication center apparatus 3.

FIG. 5 shows a case wherein the terminal 2*i* requests the center 3 for a new cryptographic algorithm Al' and a cryptographic algorithm decryption key KAl' corresponding to the cryptographic algorithm Al'.

First of all, the terminal 2*i* transmits, to the center 3, the ID information IDi of the terminal 2*i*, ID information IDA1' of the up date cryptographic algorithm, and the ID information IDAl of the cryptographic algorithm to be used for update processing. Note that the terminal 2*i* has already acquired the ID information IDA1' and the like from the center 3 and has stored them in the ID storage section 17.

In the cryptographic communication center apparatus 3 which has received each ID information, the received information is loaded into the control section 21. The control section 21 inquires of the terminal authorization management section 29 whether the terminal 2*i* has authorization to acquire a cryptographic algorithm. The terminal 2*i* transmits password information or the like for identifying itself, as needed. This password information or the like is used by the terminal authorization management section 29 to check authorization. Note that the received information may be loaded into the control section 21 after authorization is confirmed.

Upon confirmation of authorization, of the IDs loaded into the control section 21, the control section 21 outputs IDAl to the cryptographic algorithm storage section 23, and IDi to the key information storage section 22. In addition, IDi is output to the terminal key information storage section 25; IDAl', to the algorithm decryption key storage section 26; and IDAl', to the update cryptographic algorithm storage section 28.

In response to the ID information output from the control section 21, the cryptographic algorithm storage section 23 outputs the cryptographic algorithm Al to the encryption/decryption section 24. In addition, the key information storage section 22 outputs a key Kci to the encryption/decryption section 24. In this case, the key Kci is a common private key (e.g., a DES key) to be used for cryptographic communication between the terminal 21 and the center 3.

In accordance with each input ID information, the terminal key information storage section 25 outputs the key Ki unique to the terminal 2*i* to the key encryption section 27, and the algorithm decryption key storage section 26 outputs the key KAl' for the algorithm KAl' to the key encryption section 27. Note that the cryptographic communication center apparatus 3 holds all the keys (Ki, Kj, and the like) unique to the cryptographic communication terminals 2 which are registered in the terminal authorization management section 29.

The key encryption section 27 encrypts the key KAl' by using the input key Ki unique to the terminal 2*i* and cryptographic algorithm decryption key KAl', and outputs the encryption result as E1(Ki)[KAl'] to the encryption/decryption section 24.

The update cryptographic algorithm storage section 28 outputs E2(KAl')[Al'] to the encryption/decryption section 24 on the basis of the input ID information. Note that E2(KAl')[Al'] has been obtained by encrypting the cryptographic algorithm Al' by use of key KAl' requested by the terminal 2*i*.

In this manner, the cryptographic algorithm Al, private key Kci and updated information E1(Ki)[KAl'] and E2(KAl')[Al'] are input to the encryption/decryption section 24. The updated information E1(Ki)[KAl'] and E2(KAl') [Al'] are encrypted by the encryption/decryption section 24 using the private key Kci on the basis of the cryptographic algorithm Al.

This formed ciphertext E(Al, Kci)[IDAl'|E1(Ki)[KAl']|E2 (KAl')[Al']], IDc, and IDAl are transmitted from the communication unit of the center 3 to the terminal 2*i* through the network 1. That is, ID information (IDc, IDAl) is input to the control section 11 of the terminal 2*i*, and the ciphertext E(Al, Kci)[IDAl'|E1(Ki)[KAl']|E2(KAl')[Al']] is input to the encryption/decryption section 14 of the terminal 2*i*.

In the terminal 2*i* which has received this cryptographic communication, the pieces of received information are loaded into the control section 11. Then, IDAl is output to the cryptographic algorithm storage section 13, and IDc and IDAl are output to the key information storage section 12.

The key information storage section 12 outputs an encrypted private key E1(Ki)[Kci] and the algorithm decryption key E1(Ki)[KAl] to the key information decryption section 15.

The key information storage section 12, which has received these pieces of encrypted key information, decrypts these pieces of information by using the key information Ki unique to the terminal. In this case, the key KAl and private key Kci are respectively output to the cryptographic algorithm decryption section 16 and encryption/decryption section 14.

The cryptographic algorithm storage section 13, which has received IDAl from the control section 11, outputs the encrypted cryptographic algorithm E2(KAl)[Al] to the cryptographic algorithm decryption section 16. Upon reception of this information, the cryptographic algorithm decryption section 16 decrypts the encrypted cryptographic algorithm E2(KAl)[Al] by using the algorithm decryption key KAl input from the key information decryption section 15, and outputs Al to the encryption/decryption section 14.

The encryption/decryption section 14 decrypts the ciphertext E(Al, Kci)[IDAl'|E1(Ki)[KAl']|E2(KAl')[Al']] received form the center 3 by using the cryptographic algorithm Al and private key Kci. After this decryption, in correspondence with IDAl', E1(Ki)[KAl'] and E2(KAl')[Al'] are respectively output to the key information storage section 12 and cryptographic algorithm storage section 13.

In this manner, the encrypted key information and encrypt cryptographic algorithm are respectively registered in the key information storage section 12 and cryptographic algorithm storage section 13 in correspondence with the ID information of the cryptographic algorithm Al'. Subsequently, therefore, each of the sections 12 and 13 outputs information about IDAl' upon reception of IDAl'.

As described above, in the cryptographic communication terminal according to the first embodiment of the present invention, the control section 11 designates a cryptographic algorithm to be used, and the cryptographic algorithm storage section 13, key information storage section 12, and encryption/decryption section 14 are used in accordance with this designation. This allows cryptographic communication upon selecting one of a plurality of cryptographic algorithms for each communication, and inhibits the use of an algorithm exhibiting an increased possibility of being broken, thereby improving the safety of communication.

In addition, according to the cryptographic communication terminal of this embodiment, the cryptographic algorithm itself is encrypted and stored in the cryptographic algorithm storage section 13. Even if, therefore, the cryptographic algorithm is stolen, cryptanalysis and abuse of the algorithm can be prevented.

Furthermore, since keys for cryptographic communication and algorithm decryption keys themselves are encrypted, abuse of these pieces of information can be prevented upon theft. Even if, for example, both an encrypted algorithm decryption key and an encrypted algorithm are stolen, safety can be maintained.

In the cryptographic communication terminal of this embodiment, when a new cryptographic algorithm and algorithm decryption key are requested, the response data are decrypted and respectively stored in the cryptographic algorithm storage section 13 and key information storage section 12. This makes it possible to safely and efficiently register a new cryptographic algorithm through a network. Once a cryptographic algorithm is registered, the algorithm can be used by only designating the corresponding algorithm ID. That is, the acquired algorithm can be easily used.

In the cryptographic communication terminal of this embodiment, as the key information decryption section 15 for storing and processing the key Ki and the like unique to the terminal, a tamper-resistant unit whose internal structure is not easily analyzed, e.g., an IC card, is used. This realizes high robustness against the act of fraudulently acquiring the unique key, and hence can prevent fraudulent leakage of the cryptographic algorithm.

The cryptographic communication center apparatus of this embodiment includes the update cryptographic algorithm storage section 28 and key information storage section 22, and transmits a requested cryptographic algorithm and algorithm decryption key to a requesting terminal upon encrypting them. This makes it possible to safely and efficiently distribute new cryptographic algorithms through a network.

Even if, therefore, the currently used cryptographic scheme is broken, the scheme can be quickly updated to a new cryptographic scheme, thus easily realizing continuation of safe network communication.

Furthermore, the cryptographic communication center apparatus of this embodiment encrypts an algorithm decryption key by using a key unique to each terminal 2. Even if, therefore, a distributed algorithm decryption key is stolen, secrecy of the algorithm decryption key can be effectively maintained.

Note that the same effects as described above can be obtained in a cryptographic communication system constituted by cryptographic communication terminals or a cryptographic communication system constituted by a cryptographic communication center apparatus as well as these cryptographic communication terminals.

The second embodiment will be described next.

In this embodiment, another registration (updating) procedure for acquiring cryptographic algorithm that is not held in the terminal 2 in the cryptographic communication system according to the first embodiment will be described.

A cryptographic communication system according to the second embodiment has the same arrangement as that of the cryptographic communication system according to the first embodiment. These embodiments differ in cryptographic algorithms and algorithm decryption keys to be returned. For this reason, a control section 11 has the same arrangement as that in the first embodiment, and selects a cryptographic algorithm for which a terminal 2 generates an update request. These differences are those from the viewpoint of operation that changes depending on the ID information transmitted from the terminal 2 and/or ID information destination rather than those from the viewpoint of arrangement. Note that the same reference numerals as in the first embodiment denote the same parts in the second embodiment, and a detailed description thereof will be omitted.

The operation of this embodiment will be described below. Note, however, that since cryptographic communication using an already registered cryptographic algorithm is the same as that in the first embodiment, a description thereof will be omitted, and updating procedure #2 for an algorithm to be newly registered, which is different from updating procedure #1 described in the first embodiment, will be described.

Figure 6:
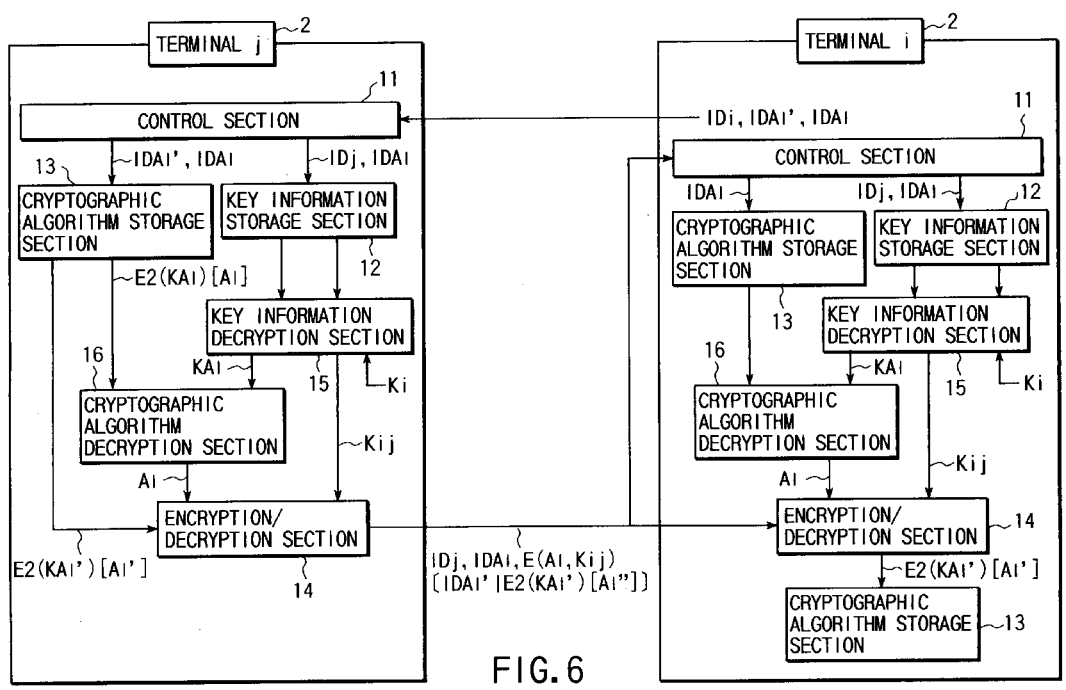
FIG. 6 is a block diagram showing updating procedure #2 for acquiring only a cryptographic algorithm from another cryptographic communication terminal in a cryptographic communication system according to the second embodiment of the present invention.

FIG. 6 shows processing in updating procedure #2 for causing a given cryptographic communication terminal to acquire only a cryptographic algorithm from another cryptographic communication terminal in the cryptographic communication system according to the second embodiment of the present invention.

As the first process in updating procedure #2, the process of causing a given cryptographic communication terminal to acquire only a cryptographic algorithm from another cryptographic communication terminal will be described first.

A terminal $2j$ has acquired a cryptographic algorithm Al' by updating procedure #1 or #2. Assume that a terminal $2i$ wants to communicate with the terminal $2j$ by using the cryptographic algorithm Al' that is not held by the terminal $2i$. In this case, before communication, first of all, the terminal $2i$ acquires and registers the cryptographic algorithm Al' and its decryption key. This registration processing is realized by concurrently generating an acquisition request for each information to the terminal $2j$ and a center 3.

When the terminal $2i$ is to request the terminal $2j$ for the new cryptographic algorithm Al', the terminal $2i$ transmits IDi, ID information IDAl' of a cryptographic algorithm to be updated, and ID information IDAl of a cryptographic algorithm to be used for updating to the terminal $2j$.

In the terminal $2j$ which has received these pieces of information, the pieces of received information are loaded into the control section 11, and IDAl and IDAl' are output from the control section 11 to a cryptographic algorithm storage section 13. In addition, Idi and IDAl are output to a key information storage section 12.

The key information storage section 12, which has received the ID information, outputs an encrypted private key E1(Ki)[Kij] and algorithm decryption key E1(Kj)[KAl] to a key information decryption section 15. In addition, the key information decryption section 15 decrypts the encrypted key information by using key information Kj unique to the terminal, e.g., a password or the key held in a IC card, and outputs a key KAl to a cryptographic algorithm decryption section, and a key Kij to an encryption/decryption section.

The cryptographic algorithm storage section 13, which has received the ID information, outputs an encrypted cryptographic algorithm E2(KAl)[Al] for cryptographic communication to the cryptographic algorithm decryption section 16. In addition, an encrypted cryptographic algorithm E2(KAl')[Al'] to be transmitted to the terminal 2i is output to an encryption/decryption section 14.

A cryptographic algorithm decryption section 16 extracts a cryptographic algorithm Al by decrypting the input encrypted cryptographic algorithm E2(KAl)[Al] using the algorithm decryption key KAl, and outputs the cryptographic algorithm Al to the encryption/decryption section 14.

The encryption/decryption section 14 encrypts the update information E2(KAl')[Al'] by using the input cryptographic algorithm Al and private key Kij. This ciphertext E(Al, Kij)[IDA1'|E2(KAl')[Al']], IDj, and IDAl are transmitted to the terminal 2i through the network 1.

These pieces of transmitted information are received by the terminal 2i and loaded into the control section 11, and IDAl is output to the cryptographic algorithm storage section 13. In addition, the control section 11 outputs IDj and IDAl to the key information storage section 12.

The key information storage section 12 outputs the encrypted private key E1(Ki)[Kij] and algorithm decryption key E1(Ki)[KAl] to the key information decryption section 15 on the basis of the input ID information.

The key information decryption section 15 decrypts the input encrypt key information by using key information Ki unique to the terminal, e.g., a password or the key held in an IC card. Of the decrypted keys, the key KAl is output to the cryptographic algorithm decryption section 16, and the key Kij for interterminal cryptographic communication is output to the encryption/decryption section 14.

The cryptographic algorithm storage section 13 outputs the cryptographic algorithm E2(KAl)[Al] encrypted on the basis of the input ID information to the cryptographic algorithm decryption section 16. The cryptographic algorithm decryption section 16 decrypts the encrypt cryptographic algorithm E2(KAl)[Al] by using the algorithm decryption key KAl, and outputs the cryptographic algorithm Al to the encryption/decryption section 14.

The encryption/decryption section 14 decrypts the ciphertext E(Al, Kij)[IDAl'|E2(KAl')[Al']] by using the cryptographic algorithm Al and private key Kij. The decrypted information is the encrypted cryptographic algorithm E2(KAl')[Al'] and registered in the cryptographic algorithm storage section 13 in correspondence with IDAl'.

In this manner, the new cryptographic algorithm Al' is registered in the terminal 2i. In order to make this information E2(KAl')[Al'] useable, a decryption key KAl' for decrypting the information E2(KAl')[Al'] and extracting Al' must be acquired. Since this decryption key KAl' is encrypted by using the private key unique to each terminal, this key cannot be acquired from another terminal 2j. For this reason, the terminal 2i must request the cryptographic communication center apparatus 3, which performs overall key management, to issue a decryption key encrypted with the private key unique to the terminal 2i.

As the second process in updating procedure #2, the process of acquiring the cryptographic algorithm decryption key KAl' from the cryptographic communication center apparatus 3 will be described next.

Figure 7:
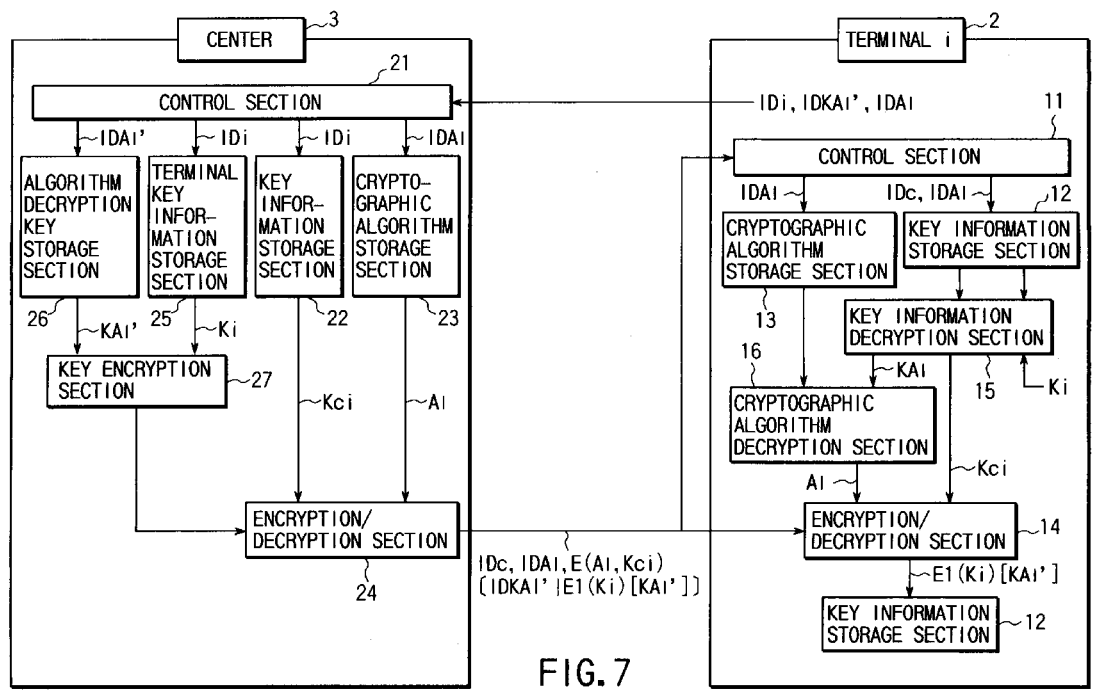
FIG. 7 is a block diagram showing updating procedure #2 for acquiring a cryptographic algorithm decryption key from a cryptographic communication center apparatus.

FIG. 7 shows processing in updating procedure #2 for acquiring a cryptographic algorithm decryption key from the cryptographic communication center apparatus.

First of all, the terminal 2i transmits, to the cryptographic communication center apparatus 3, the ID information IDi of the terminal 2i, ID information IDKAl' of a cryptographic algorithm decryption key to be requested, and the ID information IDAl of a cryptographic algorithm to be used for cryptographic communication.

In the cryptographic communication center apparatus 3 which has received these pieces of ID information, the pieces of received information are loaded into a control section 21. Thereafter, a terminal authorization management section 29 checks authorization as in updating procedure #1 in the first embodiment. Note that the above pieces of information may be loaded into the control section 21 after this authorization check.

Of these pieces of loaded ID information, IDAl and IDi are respectively output from the control section 21 to a cryptographic algorithm storage section 23 and key information storage section 22. In addition, IDi and IDKAl' are respectively output to the terminal key information storage section 25 and an algorithm decryption key storage section 26.

The cryptographic algorithm storage section 23 outputs the cryptographic algorithm Al to an encryption/decryption section 24 in accordance with this input ID information. In addition, the key information storage section 22 outputs a key KCi for cryptographic communication between the terminal and the center to the encryption/decryption section 24 in accordance with the input ID information. A terminal key information storage section 25 outputs the key Ki unique to the terminal 2i to a key encryption section 27 in accordance with the input ID information. The algorithm decryption key storage section 26 outputs a key KAl' to the key encryption section 27 in accordance with the input ID information.

The key encryption section 27 encrypts the algorithm decryption key KAl' by using the input key Ki unique to the terminal 2i, and outputs E1(Ki)[KAl'] as the encryption result to the encryption/decryption section 24. This encryption result is the encrypted cryptographic algorithm decryption key information generated exclusively for the terminal 2i.

The encryption/decryption section 24 encrypts update information E1(Ki)[KAl'] by using the cryptographic algorithm Al and private key Kci. Ciphertext E(Al, Kci) [IDKAl'|E1(Ki)[KAl']] as the encryption result, IDc, and IDAl are transmitted to the terminal 2i by the communication apparatus through the network 1.

This cryptographic communication is received by the terminal 2i and loaded into the control section 11. Of the information loaded into the control section 11, IDAl is output to the cryptographic algorithm storage section 13, and IDc and IDAl are output to the key information storage section 12.

The key information storage section 12, which has received the ID information, outputs the encrypted private key E1(Ki)[Kci] and algorithm decryption key E1(Ki)[KAl] to the key information decryption section 15 in accordance with the ID information. Upon reception of these pieces of information, the key information decryption section 15 decrypts each key information by using the key information Ki unique to the terminal, e.g., a password or the key held in an IC card. Of these pieces of decrypted information, the keys KAl and KCi are respectively output to the cryptographic algorithm decryption section 16 and encryption/decryption section 14.

The cryptographic algorithm storage section 13 outputs the encrypted cryptographic algorithm E2(KAl)[Al] to the cryptographic algorithm decryption section 16 in accordance with the input ID information.

The cryptographic algorithm decryption section 16 decrypts this encrypted cryptographic algorithm E2(KAl)[Al] by using the algorithm decryption key KAl, and outputs the cryptographic algorithm Al as the decryption result to the encryption/decryption section 14.

The encryption/decryption section 14 decrypts the ciphertext E(Al, Kci)[IDKAl'|E1(Ki)[KAl']] received from the center 3 by using the cryptographic algorithm Al and private key KCi. This decrypted information E1(Ki)[KAl'] is registered the key information storage section 12 in correspondence with IDKAl'.

As described above, in the cryptographic communication system according to the second embodiment of the present invention, the same effects as those of the first embodiment can be obtained, and updating procedure #2 can reduce the load on the center 3 as compared with updating procedure #1 in the first embodiment for the following reason. In updating procedure #1, a terminal 2 requests the center for two keys for decrypting a new cryptographic algorithm and cryptographic algorithm, and the center transmits the two requested keys to the terminal 2. In contrast to this, in updating procedure #2, a given terminal requests another terminal for a new cryptographic algorithm and an algorithm decryption key corresponding to the center 3.

In addition, in the case of updating procedure #2 as well, since cryptographic algorithm transmission processing and algorithm decryption key transmission processing are concurrently performed in a terminal and the center, these pieces of information can be acquired in the same period of time as that in procedure #1.

Note that the present invention is not limited to each embodiment described above. Various changes and modifications can be made within the spirit and scope of the invention.

In each embodiment described above, for example, the keys Ki and Kj and the like unique to all the terminals 2 which are managed by the center 3 are common private keys used in DES and the like. However, the present invention is not limited to this case. For example, a public key scheme such as RSA may be used, so private and public keys may be respectively held in each terminal 2 and the center 3. For example, Ki on the center side serves as a public key, and Ki on the terminal side serves as a private key.

Although the center 3 in each embodiment does not have a cryptographic algorithm decryption section 16 and key information decryption section 15, the center 3 may include these sections to encrypt and store a cryptographic algorithm and the key used for communication so as to have the same cryptographic communication function as that of the terminal 2. That is, the communication function on the center 3 side can be appropriately designed in accordance with various situations, e.g., the security level and external access environments.

In each embodiment described above, cryptographic communication is performed between terminals 2 or between the center 3 and a terminal 2 through a LAN, WAN, Internet, or the like. However, the application range of the present invention is not limited to this case.

For example, even if the system of the present invention is to be used as a LAN or WAN system, the present invention can be applied to an intra-enterprise information management system as well as communication between different corporations. This is because disclosure of certain information to unauthorized persons is often inhibited even within the same corporation. The present invention can also be effectively applied to a mail system.

In addition, the present invention can be applied to a case wherein each terminal 2 serves as a fax transmission/reception apparatus, and cryptographic communication is performed between the apparatuses. This is because even a telephone line can be tapped. In this case, the cryptographic scheme can be easily changed, and a fax network can be effectively used once it is built. In addition, portable telephones, PHS units, and the like may be used as the terminals 2 in the present invention.

Assume that scrambling used for cable TV broadcasting or satellite broadcasting, e.g., BS broadcasting, is regarded as encryption. According to the present invention, when this scrambling scheme is broken, this scheme can be quickly and effectively changed to a new scrambling scheme. In this case, a BS tuner corresponds to the terminal 2, and the broadcast station serves as both the terminal 2 and the center 3.

Likewise, the present invention can be applied to an ITV system, a two-way TV system, or the like. In this case, a set-top box corresponds to the terminal 2, and a system on the broadcasting side serves as both the terminal 2 and the center 3.

As is obvious from the above cases, in the present invention, a data transmission line between the terminals 2 and between each terminal 2 and the center 3 is not limited to a cable and may be a radio channel.

In addition, the terminal in this invention is not limited to a single computer holding all the functions described above. For example, when the functions constituting the present invention described in each embodiment are distributed in a server computer and other computers, a collection of these functions is also regarded as a terminal in the present invention.

Note that the apparatuses described in the embodiments can be implemented by loading programs stored in storage media into computers.

The storage medium in the present invention may take any storage forms as long as it is a computer-readable storage medium capable of storing programs. For example, such a storage medium includes a magnetic disk, floppy disk, hard disk, optical disk (CD-ROM, CD-R, DVD, or the like), magneto-optical disk (MO or the like), and semiconductor memory.

In addition, an OS (Operating System) running on a computer on the basis of commands from programs installed from a storage medium into the computer, MW (middleware) such as database management software or network software, or the like may execute part of the processes for implementing this embodiment.

The storage medium in the present invention includes not only a medium independent of the computer but also a storage medium in which a program sent through a LAN, Internet, or the like is downloaded and stored or temporarily stored.

In addition, the number of storage media is not limited to one, and the storage medium of the present invention also includes a combination of media used to execute the processes in these embodiments. That is, the present invention is not limited to any specific storage arrangement.

Note that the computer in the present invention executes the respective processes in this embodiment on the basis of the programs stored in the storage medium, and the present invention may take any arrangement, e.g., an apparatus consisting of a single device such as a personal computer or a system constituted by a plurality of devices connected to each other through a network.

Furthermore, the computer of the present invention is not limited to a personal computer, and is a generic name for devices and apparatuses capable of implementing the functions of the present invention on the basis of programs, including processing units, microcomputers, and the like contained in data processing devices.

Additional advantages and modifications will readily occur to those skilled in the art. Therefore, the invention in its broader aspects is not limited to the specific details and representative embodiments shown and described herein. Accordingly, various modification may be made without departing from the spirit or scope of the general inventive concept as defined by the appended claims and their equivalents.

What is claimed is:

1. A cryptographic communication terminal comprising:
   a control section for designating an encrypted cryptographic algorithm and an encrypted encryption/decryption key to be used in cryptographic communication based on identification information;
   a cryptographic algorithm storage section for storing not less than one type of cryptographic algorithm used for cryptographic communication in encrypted form, and outputting the encrypted cryptographic algorithm designated by the control section;
   a key information storage section for storing and outputting the encrypted encryption/decryption key designated by the control section to be used for cryptographic communication and an encrypted key used for decrypting the encrypted cryptographic algorithm;
   a key information decryption section for decrypting the encrypted encryption/decryption key used for cryptographic communication and the encrypted key used for decrypting the encrypted cryptographic algorithm to create an encryption/decryption key used for cryptographic communication and a decryption key used for decrypting the encrypted cryptographic algorithm;
   a cryptographic algorithm decryption section for decrypting the encrypted cryptographic algorithm to generate a cryptographic algorithm by using the decryption key for decrypting the encrypted cryptographic algorithm; and
     an encryption/decryption section for encrypting/decrypting communication messages by using the cryptographic algorithm and the encryption/decryption key.

2. The terminal according to claim 1, wherein the decryption key for the encrypted cryptographic algorithm is a key for secret key cryptography.

3. The terminal according to claim 1, wherein the decryption key for the encrypted cryptographic algorithm is a key for public key cryptography.

4. The terminal according to claim 1, wherein said control section instructs said cryptographic algorithm storage section to output a requested cryptographic algorithm upon receiving a transmission request for any one of the cryptographic algorithms stored in said cryptographic algorithm storage section, and
   said encryption/decryption section encrypts the requested cryptographic algorithm as information to be transmitted.

5. The terminal according to claim 1, wherein when a partner with which said terminal communicates is an apparatus including said cryptographic communication terminal, said terminal:
   requests the partner for a new cryptographic algorithm and/or a key for a corresponding encrypted algorithm;
   decrypts a corresponding response by using said encryption/decryption section;
   stores the requested cryptographic algorithm in said cryptographic algorithm storage section upon receiving the cryptographic algorithm; and
   stores the requested key for the encrypt algorithm in said key information storage section upon receiving the key.

6. A cryptographic communication system comprising not less than two cryptographic communication terminals each defined in claim 1.

7. A cryptographic communication system comprising not less than two cryptographic communication terminals each defined in claim 1 and a cryptographic communication center apparatus communicating with a cryptographic communication terminal of the cryptographic communication system,
   wherein when the algorithm decryption key is requested from a partner of the cryptographic communication center apparatus, said cryptographic communication center apparatus inputs the corresponding algorithm decryption key as the information to be transmitted to the partner to said encryption/decryption section; and said cryptographic communication terminal acquires the cryptographic algorithm and a decryption key therefor from said cryptographic communication center apparatus.

8. The terminal according to claim 1, further comprising:
   an ID storage section for storing the identification information.

9. A computer readable medium storing a program for implementing:
   a control section for designating an encrypted cryptographic algorithm and an encrypted encryption/decryption key to be used in cryptographic communication based on identification information;
   a cryptographic algorithm storage section for storing not less than one type of cryptographic algorithm used for cryptographic communication in encrypted form, and outputting the encrypted cryptographic algorithm designated by the control section;
   a key information storage section for storing and outputting the encrypted encryption/decryption key designated by the control section to be used for cryptographic communication and an encrypted key used for decrypting the encrypted cryptographic algorithm;
   a key information decryption section for decrypting the encrypted encryption/decryption key used for cryptographic communication and the encrypted key used for decrypting the encrypted cryptographic algorithm to create an encryption/decryption key used for cryptographic communication and an decryption key used for decrypting the encrypted cryptographic algorithm;
   a cryptographic algorithm decryption section for decrypting the encrypted cryptographic algorithm to generate a cryptographic algorithm by using the decryption key for decrypting the encrypted cryptographic algorithm; and
   an encryption/decryption section for encrypting/decrypting communication messages by using the cryptographic algorithm and the encryption/decryption key.

10. The computer readable medium according to claim 9, wherein:

said control section further comprises a program for, when a transmission request for any of the cryptographic algorithms stored in said cryptographic algorithm storage section is received, instructing said cryptographic algorithm storage section to output the requested cryptographic algorithm; and said encryption/decryption section further comprises a program for encrypting the requested cryptographic algorithm as information to be transmitted.

11. The computer readable medium according to claim 9, further comprising a program for, when a key for the encrypted algorithm is requested from the partner, inputting the corresponding key for the encrypted algorithm, as the information to be transmitted to the partner, to said encryption/decryption section.

12. A cryptographic communication center apparatus, comprising:

at least one cryptographic communication terminal, the terminal including:

a control section for designating an encrypted cryptographic algorithm and an encrypted encryption/decryption key to be used in cryptographic communication based on identification information;

a cryptographic algorithm storage section for storing not less than one type of cryptographic algorithm used for cryptographic communication in encrypted form, and outputting the encrypted cryptographic algorithm designated by the control section;

a key information storage section for storing and outputting the encrypted encryption/decryption key designated by the control section to be used for cryptographic communication and an encrypted key used for decrypting the encrypted cryptographic algorithm;

a key information decryption section for decrypting the encrypted encryption/decryption key used for cryptographic communication and the encrypted key used for decrypting the encrypted cryptographic algorithm to create an encryption/decryption key used for cryptographic communication and a decryption key used for decrypting the encrypted cryptographic algorithm;

a cryptographic algorithm decryption section for decrypting the encrypted cryptographic algorithm to generate a cryptographic algorithm by using the decryption key for decrypting the encrypted cryptographic algorithm; and an encryption/decryption section for encrypting/decrypting communication messages by using the cryptographic algorithm and the encryption/decryption key, wherein when the algorithm decryption key is requested from a partner of the cryptographic communication center apparatus, said apparatus inputs the corresponding algorithm decryption key as information to be transmitted to the partner to said encryption/decryption section.

13. The apparatus according to claim 12, wherein:

said apparatus further comprises an update cryptographic algorithm storage section for storing a plurality of types of cryptographic algorithms decrypted by using a key for the encrypted algorithm; and said control section, when a cryptographic algorithm is requested from said cryptographic communication terminal, instructs said update cryptographic algorithm storage section, in place of said cryptographic algorithm storage section, to output the requested cryptographic algorithm as information to be transmitted.

14. The apparatus according to claim 12, further comprising a key encryption section for, when the key for the encrypted algorithm is requested from said cryptographic communication terminal, encrypting the key for the encrypted algorithm to be transmitted, and inputting the encrypted key for the encrypted algorithm, as the information to be transmitted, to said encryption/decryption section.

15. The apparatus according to claim 14, wherein said key encryption section encrypts the key for the encrypted algorithm by using a key unique to a cryptographic communication terminal of the partner.

16. The system according to claim 14, wherein said cryptographic communication terminal acquires a cryptographic algorithm from another cryptographic communication terminal and acquires a corresponding decryption key from said cryptographic communication center apparatus.

17. The cryptographic communication center apparatus according to claim 12, further comprising:

an updated cryptographic algorithm storage section for storing a plurality of types of cryptographic algorithms encrypted by the key for the encrypted algorithm; and means for, when the cryptographic algorithm decryption key is requested from the partner, inputting a corresponding key for the encrypted algorithm, as information to be transmitted to the partner, to said encryption/decryption section, wherein said control section stores a program for, when a cryptographic algorithm is requested from said cryptographic communication terminal, instructing said update cryptographic algorithm storage means to output the requested cryptographic algorithm as information to be transmitted.

* * * * *